US010824880B2

(12) United States Patent
Yao et al.

(10) Patent No.: US 10,824,880 B2
(45) Date of Patent: Nov. 3, 2020

(54) METHODS AND SYSTEMS FOR DETECTING ENVIRONMENTAL INFORMATION OF A VEHICLE

(71) Applicant: BEIJING VOYAGER TECHNOLOGY CO., LTD., Beijing (CN)

(72) Inventors: Weilong Yao, Hangzhou (CN); Zenan Meng, Hangzhou (CN); Jian Liu, Hangzhou (CN); Hao Zhang, Beijing (CN); Shen Tan, Hangzhou (CN); Yehe Cai, Beijing (CN); Zheng Yang, Beijing (CN)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/236,481

(22) Filed: Dec. 29, 2018

(65) Prior Publication Data

US 2019/0138822 A1 May 9, 2019

Related U.S. Application Data

(63) Continuation of application No. PCT/CN2017/099173, filed on Aug. 25, 2017.

(51) Int. Cl.
*G06K 9/00* (2006.01)
*G01S 7/48* (2006.01)
(Continued)

(52) U.S. Cl.
CPC ......... *G06K 9/00791* (2013.01); *B60W 30/08* (2013.01); *G01S 7/4802* (2013.01);
(Continued)

(58) Field of Classification Search
CPC .. G06K 9/00791; G06K 9/00; G06K 9/00718; G06K 9/00208; G06K 9/00805;
(Continued)

(56) References Cited

U.S. PATENT DOCUMENTS 7,149,608 B2 * 12/2006 Itoh ........................ G08G 1/166
701/1
8,355,118 B2 * 1/2013 Ogawa .................. G01S 7/4812
356/28

(Continued)

FOREIGN PATENT DOCUMENTS

CN      103559791 A    2/2014
CN      104268935 A    1/2015
(Continued)

OTHER PUBLICATIONS

Extended European Search Report in European Application No. 17911393.1 dated Apr. 23, 2019, 8 pages.
(Continued)

*Primary Examiner* — Michael S Osinski
(74) *Attorney, Agent, or Firm* — Metis IP LLC

(57) ABSTRACT

A system for detecting a surrounding object may receive, from a camera, a first image including a plurality of pixels relating to one or more objects and receive, from one or more LiDARs, a first point set including a plurality of points corresponding to the plurality of pixels. The system may also, based on the first point set, determine 3D coordinates and reflection intensities of the plurality of points, based on which the system may generate a segment result by classifying the plurality of points. The system may further transform the 3D coordinates of the plurality of points into 2D coordinates and determine an object type of the one or more objects based on the 2D coordinates, the 3D coordinates, the segment result, and the first image.

20 Claims, 7 Drawing Sheets

(51) Int. Cl.
  *G01S 17/42* (2006.01)
  *G01S 17/06* (2006.01)
  *B60W 30/08* (2012.01)
  *G01S 17/87* (2020.01)
  *G01S 17/86* (2020.01)
  *G01S 17/931* (2020.01)

(52) U.S. Cl.
  CPC ............. *G01S 17/06* (2013.01); *G01S 17/42* (2013.01); *G01S 17/86* (2020.01); *G01S 17/87* (2013.01); *G01S 17/931* (2020.01); *G06K 9/00* (2013.01); *G06K 9/00208* (2013.01); *G06K 9/00201* (2013.01); *G06K 9/00805* (2013.01)

(58) Field of Classification Search
  CPC ........... G06K 9/00201; G06K 9/00369; G06K 9/00798; G06K 9/3241; G01S 17/931; G01S 17/936; G01S 17/86–89; G01S 17/06; G01S 17/42; G01S 17/87; G01S 17/894; G01S 17/04–06; G01S 17/023; G01S 13/865; G01S 13/867; G01S 13/931; G01S 7/4802; G01S 7/4808; B60W 30/08; B60W 30/09; B60W 30/0956; G06T 2207/10028; G06T 2207/30261; G06T 7/521; G06T 7/70
  See application file for complete search history.

(56) References Cited

U.S. PATENT DOCUMENTS

| | | | |
|---|---|---|---|
| 8,989,944 B1 | 3/2015 | Agarwal et al. | |
| 9,041,915 B2 | 5/2015 | Earhart et al. | |
| 9,098,753 B1 | 8/2015 | Zhu et al. | |
| 9,256,226 B1* | 2/2016 | Zhu | G01S 17/42 |
| 9,315,192 B1* | 4/2016 | Zhu | G06K 9/6217 |
| 9,529,451 B2* | 12/2016 | Lee | G06K 9/00362 |
| 9,697,606 B2* | 7/2017 | Stout | G01S 17/89 |
| 9,764,467 B2* | 9/2017 | Harada | B25J 9/1697 |
| 9,905,032 B2* | 2/2018 | Rogan | G06T 11/60 |
| 10,198,619 B1* | 2/2019 | Zhu | B60T 8/17 |
| 10,509,413 B2* | 12/2019 | Mou | G01S 17/87 |
| 2005/0001715 A1* | 1/2005 | Itoh | B60Q 9/008 340/435 |
| 2010/0235129 A1 | 9/2010 | Sharma et al. | |
| 2011/0255741 A1* | 10/2011 | Jung | G06K 9/00369 382/103 |
| 2012/0044476 A1* | 2/2012 | Earhart | G01S 17/86 356/4.01 |
| 2013/0293684 A1* | 11/2013 | Becker | G01S 7/4808 348/47 |
| 2015/0170526 A1 | 6/2015 | Wang et al. | |
| 2015/0202939 A1* | 7/2015 | Stettner | B60R 1/00 701/37 |
| 2015/0217451 A1* | 8/2015 | Harada | B25J 9/1697 700/253 |
| 2016/0035081 A1* | 2/2016 | Stout | G01S 17/89 382/103 |
| 2016/0104314 A1* | 4/2016 | Nakazato | G06T 7/50 382/285 |
| 2016/0202355 A1* | 7/2016 | Liu | G01S 13/931 342/70 |
| 2016/0282468 A1 | 9/2016 | Gruver et al. | |
| 2016/0350921 A1* | 12/2016 | Bataller | G06K 9/00771 |
| 2017/0010623 A1* | 1/2017 | Tang | H04N 5/247 |
| 2017/0039436 A1 | 2/2017 | Chen et al. | |
| 2017/0061632 A1 | 3/2017 | Lindner et al. | |
| 2017/0124781 A1* | 5/2017 | Douillard | G08G 1/202 |
| 2017/0132334 A1* | 5/2017 | Levinson | G06F 30/20 |
| 2017/0178498 A1* | 6/2017 | Mcerlean | G08G 1/166 |
| 2017/0243352 A1* | 8/2017 | Kutliroff | G06T 19/006 |
| 2018/0136332 A1* | 5/2018 | Barfield, Jr. | G01S 17/89 |
| 2018/0190016 A1* | 7/2018 | Yang | G06T 7/246 |
| 2018/0205926 A1* | 7/2018 | Mogalapalli | H04N 13/207 |
| 2018/0316905 A1* | 11/2018 | Nobori | H04N 13/246 |
| 2019/0086546 A1* | 3/2019 | Tsishkou | G06K 9/627 |
| 2019/0179329 A1* | 6/2019 | Keivan | G05D 1/0238 |
| 2019/0347502 A1* | 11/2019 | Shimbo | G06K 9/00805 |
| 2020/0116482 A1* | 4/2020 | Hino | G01C 7/04 |

FOREIGN PATENT DOCUMENTS

| | | |
|---|---|---|
| CN | 106570454 A | 4/2017 |
| CN | 106908775 A | 6/2017 |
| EP | 1835475 A1 | 9/2007 |
| JP | 2004069328 A | 3/2004 |

OTHER PUBLICATIONS

Kiyosumi Kidono et al., Pedestrian Recognition Integrating High-definition LIDAR with Vision, The 18th Symposium on Sensing via Image Information, IS2-07, 1-6, 2012.

Xiaofeng Han et al., A real-time LIDAR and Vision based Pedestrian Detection System for Uunmanned Ground Vehicles, 2015 3rd IAPR Asian Conference on Pattern Recognition, 635-639, 2015.

Cristiano Premebida et al., A Lidar and Vison-based Approach for Pedestrian and Vehicle Detection and Tracking, Proceedings of the 2007 IEEE Intelligent Transportation Systems Conference, WeD1. 1, 1044-1049, 2007.

The Examination Report in Australian Application No. 2017417170 dated Jan. 17, 2020, 5 pages.

The Notice of Allowance in Japanese Application No. 2018564348 dated Mar. 3, 2020, 4 pages.

International Search Report in PCT/CN2017/099173 dated Apr. 28, 2018, 5 pages.

Written Opinion in PCT/CN2017/099173 dated Apr. 28, 2018, 4 pages.

* cited by examiner

400

```
┌─────────────────────────────────────────────────────────────┐
│ Receiving, from a camera, a first image including a plurality│ ~ 410
│ of pixels relating to one or more objects                    │
└─────────────────────────────────────────────────────────────┘
                              ↓
┌─────────────────────────────────────────────────────────────┐
│ Receiving, from one or more LiDARs, a first point set        │
│ including a plurality of points corresponding to the plurality of│ ~ 420
│ pixels of the first image                                    │
└─────────────────────────────────────────────────────────────┘
                              ↓
┌─────────────────────────────────────────────────────────────┐
│ Determining first 3D coordinates of the plurality of points and│
│ reflection intensity of the plurality of points based on the first│ ~ 430
│ point set                                                    │
└─────────────────────────────────────────────────────────────┘
                              ↓
┌─────────────────────────────────────────────────────────────┐
│ Generating a segment result by classifying the plurality of  │
│ points based on the first 3D coordinates of the plurality of │ ~ 440
│ points and the reflection intensities of the plurality of points│
└─────────────────────────────────────────────────────────────┘
                              ↓
┌─────────────────────────────────────────────────────────────┐
│ Transforming the first 3D coordinates of the plurality of    │ ~ 450
│ points into first 2D coordinates of the plurality of points  │
└─────────────────────────────────────────────────────────────┘
                              ↓
┌─────────────────────────────────────────────────────────────┐
│ Determining an object type of the one or more objects based  │
│ on the first 2D coordinates of the plurality of points, the first│ ~ 460
│ 3D coordinates of the plurality of points, the segments result,│
│ and the first image                                          │
└─────────────────────────────────────────────────────────────┘
                              ↓
┌─────────────────────────────────────────────────────────────┐
│ Determining environmental information relating to the one or │ ~ 470
│ more objects in the first image based on the object type     │
└─────────────────────────────────────────────────────────────┘
```

FIG. 4

METHODS AND SYSTEMS FOR DETECTING ENVIRONMENTAL INFORMATION OF A VEHICLE

CROSS-REFERENCE TO RELATED APPLICATIONS

This application is a continuation of International Application No. PCT/CN2017/099173 filed on Aug. 25, 2017, the contents of which are incorporated herein by reference to their entirety.

TECHNICAL FIELD

The present disclosure generally relates to vehicles, and more particularly, to methods and systems for detecting environmental information of a vehicle.

BACKGROUND

With the process of micro-electronic technology and robot technology, driverless technology develops rapidly nowadays. Detecting environmental information of a vehicle may be an important technology of a driverless system. In existing methods and systems for detecting environmental information, it is hard to determine the environmental information accurately and timely, and there is a blind region of vision that could not be detected by the driverless system. Therefore, it is desirable to provide methods and systems for detecting environmental information of a vehicle accurately and timely.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to one aspect of the present disclosure, a system may comprise one or more processors, and a storage device configured to communicate with the one or more processors. The storage device may include a set of instructions. When the one or more processors executing the set of instructions, the one or more processors may be directed to perform one or more of the following operations. The one or more processors may receive, from a camera, a first image including a plurality of pixels relating to one or more objects. The one or more processors may receive, from one or more light detection and ranging equipments (LiDARs), a first point set including a plurality of points corresponding to the plurality of pixels of the first image. The one or more processors may determine first 3D coordinates of the plurality of points and reflection intensities of the plurality of points based on the first point set. The one or more processors may generate a segment result by classifying the plurality of points based on the first 3D coordinates of the plurality of points and the reflection intensities of the plurality of points. The one or more processors may transform the first 3D coordinates of the plurality of points into first 2D coordinates of the plurality of points. The one or more processors may determine an object type of the one or more objects based on the first 2D coordinates of the plurality of points, the first 3D coordinates of the plurality of points, the segment result, and the first image.

In some embodiments, the one or more processors may determine environmental information relating to the one or more objects based on the object type.

In some embodiments, the environmental information relating to the one or more objects may include at least one of the object type of the one or more objects, a motion state of at least one of the one or more objects, a velocity of at least one of the one or more objects relative to a vehicle including the one or more LiDARs and the camera, an acceleration of at least one of the one or more objects relative to the vehicle, a moving direction of at least one of the one or more objects, or a distance between at least one of the one or more objects and the vehicle.

In some embodiments, the first point set may include a first point subset obtained by a first LiDAR and a second point subset obtained by a second LiDAR.

In some embodiments, to determine the first 3D coordinates of the plurality of points, the one or more processors may determine second 3D coordinates of the first point subset corresponding to a first 3D coordinate system relating to the first LiDAR. The one or more processors may determine third 3D coordinates of the second point subset corresponding to a second 3D coordinate system relating to the second LiDAR. The one or more processors may transform the third 3D coordinates into fourth 3D coordinates of the second point subset corresponding to the first 3D coordinate system. The one or more processors may determine the first 3D coordinates based on the second 3D coordinates of the first point subset and the fourth 3D coordinates of the second point subset.

In some embodiments, to transform the first 3D coordinates of the plurality of points into the first 2D coordinates of the plurality of points, the one or more processors may obtain a transformation matrix. The one or more processors may transform the first 3D coordinates of the plurality of points into the first 2D coordinates of the plurality of points based on the transformation matrix.

In some embodiments, to obtain the transformation matrix, the one or more processors may receive, from one of the one or more LiDARs, a second point set including a plurality of points relating to a target. The one or more processors may receive, from the camera, a second image including a plurality of pixels relating to the target. The one or more processors may determine second 3D coordinates of the plurality of points relating to the target. The one or more processors may determine second 2D coordinates of the plurality of pixels relating to the target. The one or more processors may determine the transformation matrix based on the second 3D coordinates and the second 2D coordinates.

In some embodiments, to determine the transformation matrix based on the second 3D coordinates and the second 2D coordinates, the one or more processors may determine the transformation matrix based on a least square method.

In some embodiments, the target may include a 2D pattern having one or more points, each of which may be a center of a circle.

In some embodiments, to determine the object type of the one or more objects, the one or more processors may determine the object type of the one or more objects based on a Faster-RCNN model.

According to another aspect of the present disclosure, a method may include one or more of the following operations. The one or more processors may receive, from a camera, a first image including a plurality of pixels relating to one or more objects. The one or more processors may receive, from one or more light detection and ranging equipments (LiDARs), a first point set including a plurality of points corresponding to the plurality of pixels of the first image. The one or more processors may determine first 3D coordinates of the plurality of points and reflection intensities of the plurality of points based on the first point set. The one or more processors may generate a segment result by classifying the plurality of points based on the first 3D coordinates of the plurality of points and the reflection intensities of the plurality of points. The one or more processors may transform the first 3D coordinates of the plurality of points into first 2D coordinates of the plurality of points. The one or more processors may determine an object type of the one or more objects based on the first 2D coordinates of the plurality of points, the first 3D coordinates of the plurality of points, the segment result, and the first image.

According to yet another aspect of the present disclosure, a non-transitory computer readable medium may comprise at least one set of instructions. The at least one set of instructions may be executed by one or more processors of a computing device. The at least one set of instructions may cause the computing device to perform a method. The method may comprises: receiving, from a camera, a first image including a plurality of pixels relating to one or more objects; receiving, from one or more light detection and ranging equipments (LiDARs), a first point set including a plurality of points corresponding to the plurality of pixels of the first image; determining first 3D coordinates of the plurality of points and reflection intensities of the plurality of points based on the first point set; generating a segment result by classifying the plurality of points based on the first 3D coordinates of the plurality of points and the reflection intensities of the plurality of points; transforming the first 3D coordinates of the plurality of points into first 2D coordinates of the plurality of points; and determining an object type of the one or more objects based on the first 2D coordinates of the plurality of points, the first 3D coordinates of the plurality of points, the segment result, and the first image.

According to yet another aspect of the present disclosure, a system may comprises: an image receiving module configured to receive, from a camera, a first image including a plurality of pixels relating to one or more objects; a point receiving module configured to receive, from one or more light detection and ranging equipments (LiDARs), a first point set including a plurality of points corresponding to the plurality of pixels of the first image; a point information determination module configured to determine first 3D coordinates of the plurality of points and reflection intensities of the plurality of points based on the first point set; a segment result generation module configured to generate a segment result by classifying the plurality of points based on the first 3D coordinates of the plurality of points and the reflection intensities of the plurality of points; a transformation module configured to transform the first 3D coordinates of the plurality of points into first 2D coordinates of the plurality of points; and a type determination module configured to determine an object type of the one or more objects based on the first 2D coordinates of the plurality of points, the first 3D coordinates of the plurality of points, the segment result, and the first image.

BRIEF DESCRIPTION OF THE DRAWINGS

The present disclosure is further described in terms of schematic embodiments. These schematic embodiments are described in detail with reference to the drawings. The drawings are not to scale. These embodiments are non-limiting schematic embodiments, in which like reference numerals represent similar structures throughout the several views of the drawings, and wherein:

FIG. 4 is a flow chart illustrating an exemplary process for determining environmental information according to some embodiments of the present disclosure;

DETAILED DESCRIPTION

Figure 1:
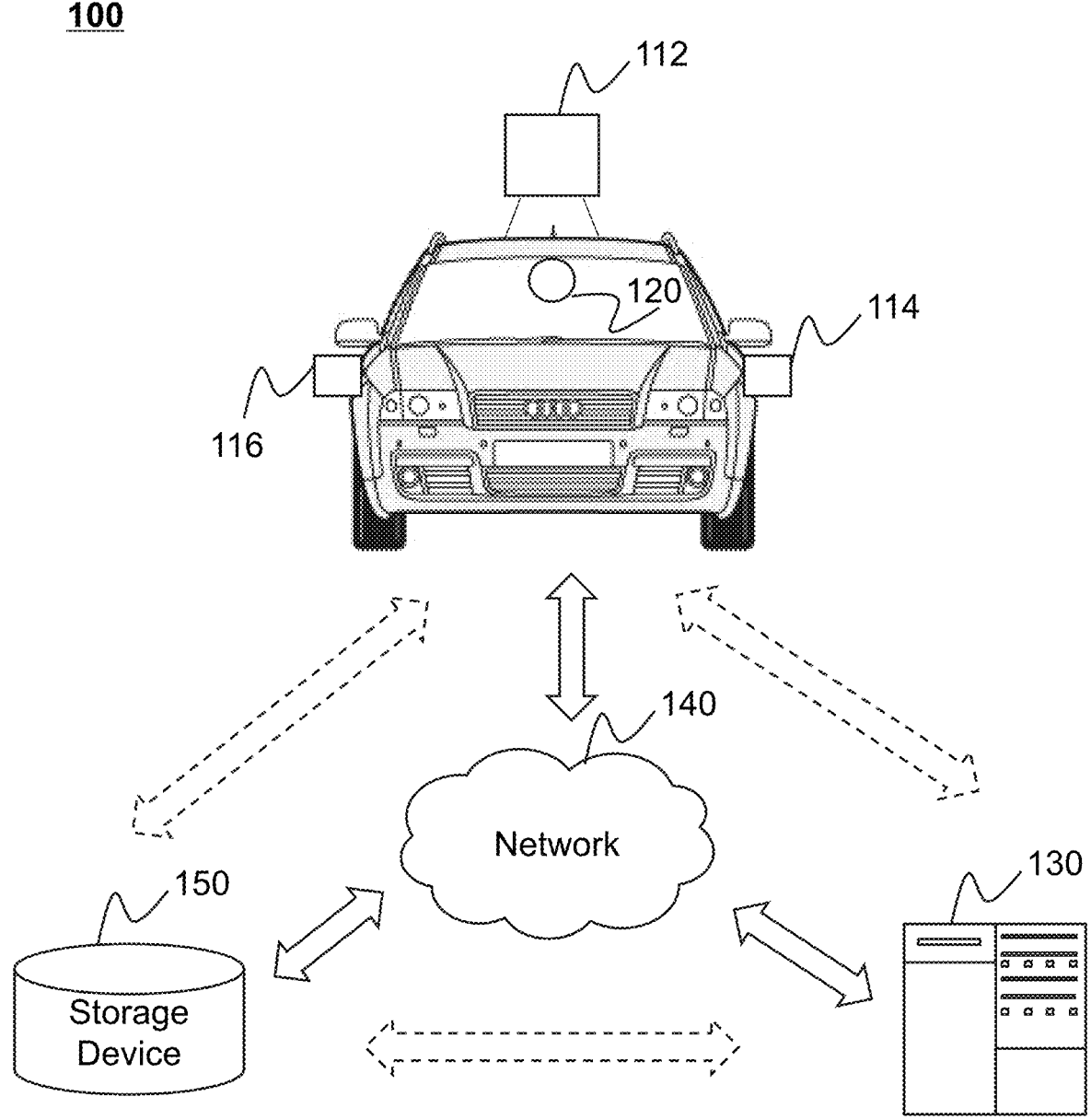
FIG. 1 is a schematic diagram illustrating an exemplary environmental information detecting system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Embodiments of the present disclosure may be applied to a field of robot and different transportation situations including but not limited to land transportation situation, sea transportation situation, air transportation situation, space transportation situation, or the like, or any combination thereof. A vehicle in the transportation situations may include a horse, a carriage, a rickshaw (e.g., a bike, a tricycle), an electromobile (e.g., an electric bike, an electric tricycle), a car (e.g., a taxi, a bus, a private car), a train, a subway, a vessel, an aircraft (e.g., an airplane, a helicopter, a space shuttle, a rocket, a hot-air balloon), a driverless vehicle, or the like, or any combination thereof. It should be understood that application scenarios of the system and method disclosed herein are only some examples or embodiments. Those having ordinary skills in the art, without further creative efforts, may apply these drawings to other application scenarios.

FIG. 1 is a schematic diagram illustrating an exemplary environmental information detecting system 100 according to some embodiments of the present disclosure. The environmental information detecting system 100 may be configured to detect the information of the environmental around a vehicle (e.g., a driverless vehicle). The information of the environmental (e.g., also referred to as the environmental information) around the vehicle may include an object type (e.g., a person, an animal, a tree, a roadblock, a building, or a vehicle) of objects that are within a distance (e.g., 500 meters) from the vehicle, motion states of the objects, velocities of the objects relative to the vehicle, accelerations of the objects relative to the vehicle, moving directions of the objects, distances between the vehicle and the objects, or the like, or any combination thereof. The motion state may include a static state or a moving state. The processing device 130 may direct the vehicle to avoid an obstacle based on the environmental information. For example, when the processing device 130 determines that the distance between the vehicle and an object is less than a distance threshold based on the environmental information, the processing device 130 may send instructions and control the vehicle, such as braking, slowing down the velocity of the vehicle, changing the moving direction of the vehicle, or moving backward to direct the vehicle to avoid the object.

The environmental information detecting system 100 may include one or more light detection and ranging equipment (LiDARs) (e.g., a LiDAR 112, a LiDAR 114, or a LiDAR 116), a camera 120, a processing device 130, a network 140, and a storage device 150.

The one or more LiDARs may be configured to obtain point sets including a plurality of points relating to objects (e.g., a person, an animal, a tree, a roadblock, building, or a vehicle) that are within the scope of the one or more LiDARs (e.g., a distance, say 500 meters, from the vehicle). A point in a point set may include 3D coordinates of the point and a reflection intensity of the point. The reflection intensity of the point may refer to the intensity of a laser beam reflected by the point.

In some embodiments, a LiDAR may include a laser emitter, a scanning and optical component, and a photosensitive component. The laser emitter may be configured to emit laser beams with a certain wavelength. For example, the laser emitter may emit laser beams of which the wavelength ranges from 600 nm to 1000 nm.

Take a laser beam as an example, when the laser beam shines on the point of an object, the point may reflect a part of the laser beam, and the reflected laser beam may be received by the LiDAR. The scanning and optical component may be configured to remark the emitting time of the laser beam and the receiving time of the reflected laser beam and determine an interval between the emitting time and the receiving time. The scanning and optical component may also be configured to determine an angle between the reflected laser beam and the ground. The LiDAR may determine 3D coordinates of the point based on the interval between the emitting time and the receiving time, and the angle between the reflected laser beam and the ground. The LiDAR may also determine a distance between the LiDAR and the point based on the interval between the emitting time and the receiving time, and the velocity of light ($\approx 3 \times 10^8$ m/s). The LiDAR may determine the 3D coordinates of the point based on the distance between the LiDAR and the point, and the angle between the reflected laser beam and the ground. In some embodiments, the LiDAR may determine the 3D coordinates of the point under a 3D coordinate system corresponding to the LiDAR.

During the process from emission to receiving, the intensity of the laser beam may be reduced because, for example, a part of the laser beam may be absorbed by the point of the object. The photosensitive component may be configured to detect an intensity of the reflected laser beam. The intensity of the reflected laser beam may be affected by the material of the object. The intensity of the reflected beam may be used to roughly determine which points belong to the same object.

In some embodiments, the LiDAR may emit a plurality of laser beams and rotate at a certain angular velocity to make the plurality of laser beams shine on objects that are within a distance (e.g., 500 meters) from the vehicle such that the LiDAR may obtain a point set including a plurality of points relating to the objects. For example, the LiDAR may obtain a point set when the LiDAR completes a rotation of 360°.

In some embodiments, because objects surrounding the vehicle may constantly be changing, the LiDAR may constantly emit laser beams and constantly obtain point sets relating to the objects surrounding the vehicle. In some embodiments, the LiDAR may transmit the point sets to the storage device 150 and/or the processing device 130.

In some embodiments, the one or more LiDARs may be installed at any location of the vehicle. For example, the vehicle may be configured with one LiDAR. The LiDAR (e.g., the LiDAR 112) may be assembled at the top of the vehicle. As another example, the vehicle may be configured with three LiDARs (e.g., the LiDAR 112, the LiDAR 114, and the LiDAR 116). One of the three LiDARs (e.g., the LiDAR 112) may be assembled at the top of the vehicle, and the other two LiDARs (e.g., the LiDAR 114 and the LiDAR 116) may be assembled at two sides of the vehicle, respectively. The number and the position of the LiDARs may be determined based on a principle of no blind region of vision. In some embodiments, when more than one LiDARs are installed on the vehicle, the more than one LiDARs may obtain points simultaneously. A point set may include points obtained by the more than one LiDARs.

The camera 120 may be configured to obtain one or more images relating to objects (e.g., a person, an animal, a tree, a roadblock, building, or a vehicle) that are within the scope of the camera 120 (e.g., a distance, for instance, 500 meters from the vehicle). As used in this application, an image may be a still image, a video, a streaming video, or a video frame obtained from a video. In some embodiments, the camera 120 may be a digital camera, a web camera, a smartphone, a tablet, a laptop, a video gaming console equipped with a web camera, a camera with multiple lenses, etc. In some embodiment, the camera 120 may be configured to capture two-dimensional (2D) images and/or three-dimensional (3D) images. For example, the camera 120 may be a static camera, a pan-tilt-zoom camera, a moving camera, a stereoscopic camera, a structured light camera, a time-of-flight camera, etc. In some embodiments, the camera 120 may also be a camera equipped with time-of-flight device, a Kinect sensor, a 3D laser scanner, a photographic scanner, etc. In some embodiments, the camera 120 may rotate to capture an image including objects surrounding the vehicle. For example, the camera 120 may obtain an image when the camera 120 completes a rotation of 360°.

In some embodiments, because objects surrounding the vehicle may constantly be changing, the camera 120 may constantly capture images relating to the objects surrounding the vehicle. In some embodiments, the obtaining of a point set of the one or more LiDARs and the capture of an image of the camera 120 may be simultaneous such that the points in the point set may correspond to the pixels in the image. In some embodiments, the camera 120 may transmit the image(s) to the storage device 150 and/or the processing device 130.

In some embodiments, the camera 120 may be assembled in any part of the vehicle. For example, the camera 120 may be installed at the front of the vehicle, as shown in FIG. 1.

Figure 2:
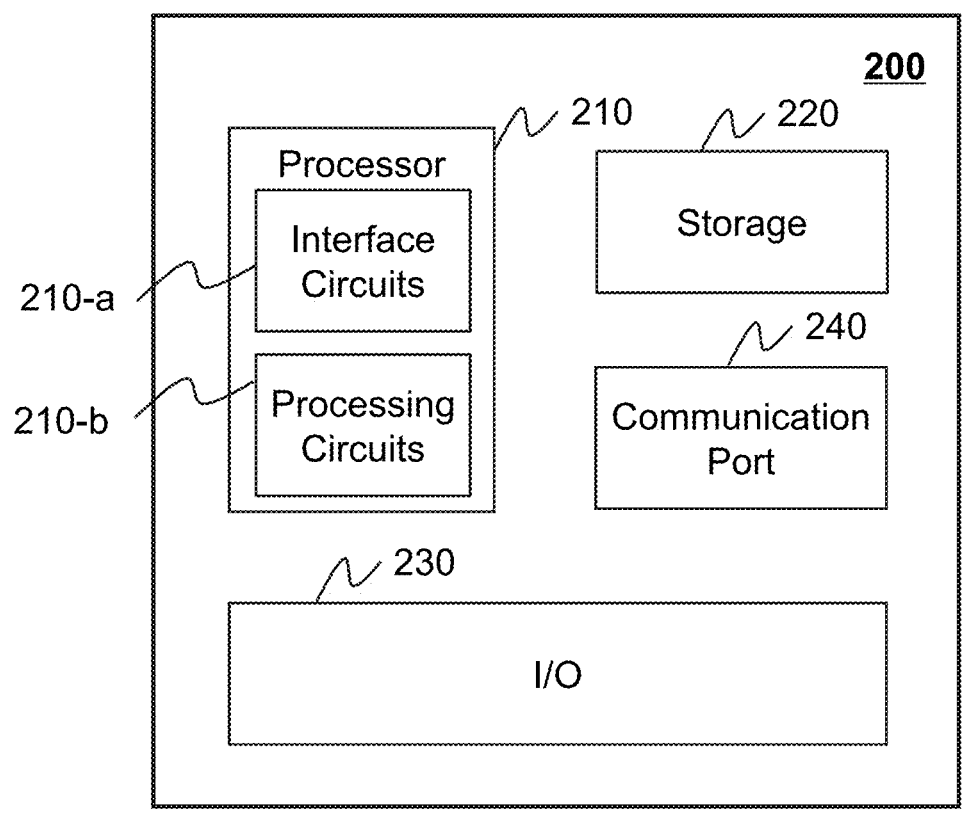
FIG. 2 is a schematic block diagram illustrating exemplary hardware and software components of a computing device according to some embodiments of the present disclosure.

The processing device 130 may process data and/or information obtained from the one or more LiDARs (e.g., the LiDAR 112, the LiDAR 114, or the LiDAR 116), the camera 120, or the storage device 150. For example, the processing device 130 may process a point set obtained from the LiDAR 112. As another example, the processing device 130 may process an image obtained from the camera 120. In some embodiments, the processing device 130 may be a single server or a server group. The server group may be centralized or distributed. In some embodiments, the processing device 130 may be local or remote. For example, the processing device 130 may access information and/or data stored in the one or more LiDARs (e.g., the LiDAR 112, the LiDAR 114, or the LiDAR 116), the camera 120, or the storage device 150 via the network 140. As another example, the processing device 130 may be directly connected to the one or more LiDARs (e.g., the LiDAR 112, the LiDAR 114, or the LiDAR 116), the camera 120, or the storage device 150 to access stored information and/or data. In some embodiments, the processing device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 130 may be implemented by a computing device 200 having one or more components as illustrated in FIG. 2.

The network 140 may include any suitable network that can facilitate the exchange of information and/or data for the environmental information detecting system 100. In some embodiments, one or more components of the environmental information detecting system 100 (e.g., the one or more LiDARs, the camera 120, the processing device 130, or the storage device 150) may communicate information and/or data with one or more other components of the environmental information detecting system 100 via the network 140. For example, the processing device 130 may obtain an image from the camera 120 via the network 140. As another example, the processing device 130 may obtain a point set from the LiDAR 112 via the network 140. The network 140 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points such as base stations and/or internet exchange points through which one or more components of the environmental information detecting system 100 may be connected to the network 140 to exchange data and/or information.

The storage device 150 may store data, instructions, and/or any other information. In some embodiments, the storage device 150 may store data obtained from the one or more LiDARs, the camera 120, or the processing device 130. In some embodiments, the storage device 150 may store data and/or instructions that the processing device 130 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more other components in the environmental information detecting system 100 (e.g., the processing device 130, the one or more LiDARs, or the camera 120). One or more components of the environmental information detecting system 100 may access the data or instructions stored in the storage device 150 via the network 140. In some embodiments, the storage device 150 may be directly connected to or communicate with one or more other components in the environmental information detecting system 100 (e.g., the processing device 130, the one or more LiDARs, or the camera 120). In some embodiments, the storage device 150 may be part of the processing device 130.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 150 may be a data storage including cloud computing platforms, such as a public cloud, a private cloud, a community and hybrid cloud, etc. However, those variations and modifications do not depart the scope of the present disclosure.

FIG. 2 is a schematic diagram illustrating exemplary hardware and/or software components of an exemplary computing device 200 on which the processing device 130 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing device 130 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may process a point set obtained from the one or more LiDARs, the storage device 150, and/or any other component of the environmental information detecting system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the one or more LiDARs, the camera 120, the storage device 150, and/or any other component of the environmental information detecting system 100. In some embodiments, the storage 220 may include a mass storage, removable storage, a volatile read-and-write memory, a read-only memory (ROM), or the like, or any combination thereof. For example, the mass storage may include a magnetic disk, an optical disk, solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 130 for determining the environmental information of the vehicle.

The I/O 230 may input and/or output signals, data, information, etc. In some embodiments, the I/O 230 may enable a user interaction with the processing device 130. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 140) to facilitate data communications. The communication port 240 may establish connections between the processing device 130 and the one or more LiDARs, the camera 120, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

One of ordinary skill in the art would understand that when an element of the environmental information detecting system 100 performs, the element may perform through electrical signals and/or electromagnetic signals. For example, when the processing device 130 processes a task, such as making a determination, or identifying information, the processing device 130 may operate logic circuits in its processor to process such task. When the one or more LiDARs and/or the camera 120 send out data (e.g., a point set and/or an image) to the processing device 130, the one or more LiDARs and/or the camera 120 may generate electrical signals encoding the data. The one or more LiDARs and/or the camera 120 may then send the electrical signals to an input port of the processing device 130. If the one or more LiDARs and/or the camera 120 communicates with the processing device 130 via a wired network, the input port may be physically connected to a cable. If the one or more LiDARs and/or the camera 120 communicates with the processing device 130 via a wireless network, the input port of the processing device 130 may be one or more antennas, which may convert the electrical signals to electromagnetic signals. Within an electronic device, such as the one or more LiDARs, the camera 120, or the processing device 130, when a processor thereof processes an instruction, sends out an instruction, and/or performs an action, the instruction and/or action is conducted via electrical signals. For example, when the processor retrieves or saves data from a storage medium (e.g., the storage device 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 3:
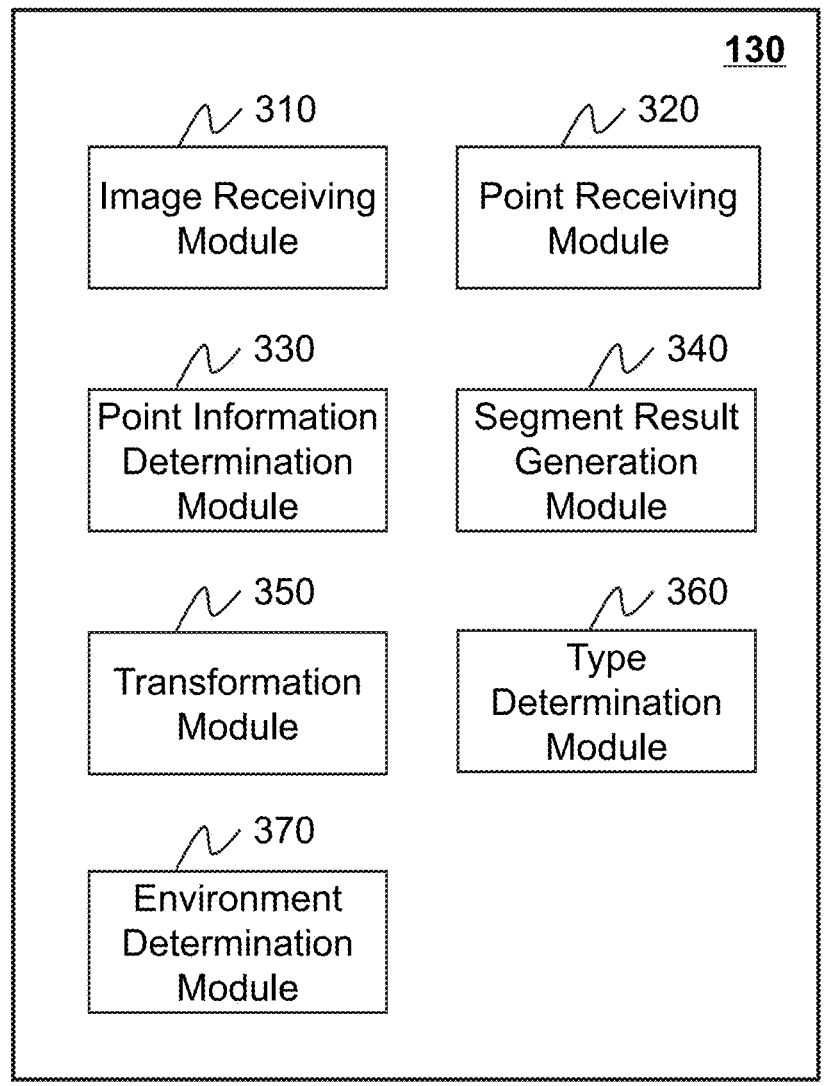
FIG. 3 is a block diagram illustrating an exemplary processing device according to some embodiments of the present disclosure.

FIG. 3 is a block diagram illustrating an exemplary processing device 130 according to some embodiments of the present disclosure. The processing device 130 may include an image receiving module 310, a point receiving module 320, a point information determination 330, a segment result generation module 340, a transformation module 350, a type determination module 360, and an environment determination module 370.

The image receiving module 310 may be configured to receive an image from the camera 120. The image may include a plurality of pixels relating to one or more objects that are within the scope of the camera 120 (e.g., a distance, say 500 meters, from the vehicle). In some embodiments, because objects surrounding the vehicle may constantly be changing, the camera 120 may constantly capture images relating to the objects surrounding the vehicle and transmit the images to the image receiving module 310 in real time.

The point receiving module 320 may be configured to receive a point set from one or more LiDARs. The point set may include a plurality of points corresponding to the pixels of the image captured simultaneously with the point set. In some embodiments, when two or more LiDARs are installed on the vehicle, the point set may include points obtained by the two or more LiDARs. For example, the LiDAR 112, the LiDAR 114, and the LiDAR 116 may be installed on the vehicle. The point set may include points obtained by the LiDAR 112, the LiDAR 114, and the LiDAR 116.

In some embodiments, because objects surrounding the vehicle may constantly be changing, the one or more LiDARs may constantly obtain point sets relating to the objects surrounding the vehicle and transmit the point sets to the point receiving module 320 in real time.

The point information determination module 330 may be configured to determine 3D coordinates of the plurality of points and reflection intensities of the plurality of points based on the point set. The points obtained by a LiDAR may include reflection intensities of the points, and 3D coordinates of the points determined under a 3D coordinate system corresponding to the LiDAR. In some embodiments, if the point set includes points obtained by one LiDAR, the point information determination module 330 may directly determine the 3D coordinates based on the plurality of points. In some embodiments, different LiDARs may correspond to different 3D coordinate systems. If the point set includes points obtained by more than one LiDARs, the 3D coordinates of the points obtained by different LiDARs may correspond to different 3D coordinate systems. The point information determination module 330 may determine a 3D coordinate system corresponding to one of the LiDARs as a standard 3D coordinate system, and transform the 3D coordinates corresponding to other 3D coordinate systems into 3D coordinates under the standard coordinate system (e.g., as described in detail in connection with FIG. 5 below).

The segment result generation module 340 may be configured to generate a segment result by classifying the plurality of points based on the 3D coordinates of the plurality of points and the reflection intensities of the plurality of points. For example, the segment result generation module 340 may classify points of which the 3D coordinates are approximately similar to the same group. As another example, the segment result generation module 340 may classify points of which the reflection intensities are approximately similar to the same group. The points in the point set may be roughly classified into several groups based on the segment result.

The segment result generation module 340 may generate the segment result according to an algorithm that may classify the points. For example, the algorithm may be a clustering algorithm. The clustering algorithm may include a partitioning method, a hierarchical method, a density-based method, a grid-based method, a model-based method, or the like, or any combination thereof.

The transformation module 350 may be configured to transform the 3D coordinates of the plurality of points into 2D coordinates of the plurality of points. The transformation module 350 may determine the 2D coordinates using a transformation matrix (e.g., as described in detail in connection with FIGS. 7 and 8 below).

The type determination module 360 may be configured to determine an object type of the one or more objects in the image based on the 2D coordinates of the plurality of points, the 3D coordinates of the plurality of points, the segment result, and the image. The type determination module 360 may identify the one or more objects in the image by determining a bounding box for each of the one or more objects based on the segment result and the 2D coordinates of the plurality of points. For one of the one or more objects, the type determination module 360 may determine the object type based on the 3D coordinates of the center point of the object, the length of the object, the width of the object, the height of the object, the number of points of the object, or the like, or any combination thereof. The center point of the object may refer to the center pixel (or voxel) of the bounding box of the object. The type determination module 360 may determine the 3D coordinates of the center point based on the 3D coordinates of the point of which the 2D coordinates are similar to the 2D coordinates of the center pixel of the bounding box. The type determination module 360 may determine the length, the width, and the height of the object based on the 3D coordinates of points of which the 2D coordinates are similar to the 2D coordinates of pixels included in the bounding box. The number of points of the object may be the number of points of which the 2D coordinates are similar to the 2D coordinates of pixels included in the bounding box.

The type determination module 360 may input the 3D coordinates of the center point of the object, the length of the object, the width of the object, the height of the object, and the number of points of the object into, for example, a Faster-RCNN model. The Faster-RCNN model may output probabilities of different object types the object belongs to, and take the object type with the highest probability as the object type of the object. For example, the Faster-RCNN model may determine that the probability of belonging to a vehicle is 45%, the probability of belonging to a person is 60%, and the probability of belonging to a building is 10%. The Faster-RCNN model may accordingly determine the object as a person.

The environment determination module 370 may be configured to determine environmental information relating to the one or more objects based on the object type. In some embodiments, the environmental information relating to the one or more objects may include the object type of the one or more objects, a motion state of at least one of the one or more objects, a velocity of at least one of the one or more objects relative to the vehicle, an acceleration of at least one of the one or more objects relative to the vehicle, a moving direction of at least one of the one or more objects, a distance between the vehicle and at least one of the one or more objects, or the like, or any combination thereof. The motion state may include a static state or a moving state.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuits dies, or implemented in a Multiple Chip Module (MCM) of multiple integrated circuit dies in a common package, as examples.

The modules in the processing device 130 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the image receiving module 310 may be integrated into the point receiving module 320 as a single module which may both receive images and point sets.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 130 may further include a storage module (not shown in FIG. 3). The storage module may be configured to store data generated during any process performed by any component of in the processing device 130. As another example, each of components of the processing device 130 may correspond to a storage module. Additionally or alternatively, the components of the processing device 130 may share a common storage module.

FIG. 4 is a flow chart illustrating an exemplary process for determining environmental information according to some embodiments of the present disclosure. In some embodiments, the process 400 may be implemented in the environmental information detecting system 100 illustrated in FIG. 1. For example, the process 400 may be stored in a storage medium (e.g., the storage device 150, or the storage 220) as a form of instructions, and invoked and/or executed by the processing device 130 (e.g., the processor 220 of the processing device 130, or one or more modules in the processing device 130 illustrated in FIG. 3). The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In some embodiments, the camera 120 may constantly capture images and transmit the images to the processing device 130 in real time. The one or more LiDARs may constantly obtain points sets and transmit the point sets to the processing device 130 in real time. The processing device 130 may process the images and the point sets constantly. For brevity, the process 400 may describe a process for processing an image and a point set corresponding to the image. It should be noted that the description of the process 400 is merely provided for the purposes of illustration and not intended to limit the scope of the present disclosure. For persons having ordinary skills in the art, multiple variations and modifications may be made under the teachings of the present disclosure. However, those variations and modifications do not depart from the scope of the present disclosure. The processing device 130 may process images and point sets by repeating the process 400.

In 410, the image receiving module 310 may receive, from the camera 120, the first image including a plurality of pixels relating to one or more objects that are within the scope of the camera 120 (e.g., a distance, say 500 meters, from the vehicle).

In 420, the point receiving module 320 may receive, from the one or more LiDARs, a first point set including a plurality of points corresponding to the plurality of pixels of the first image. In some embodiments, the first point set may be obtained simultaneously with the first image.

In some embodiments, when two or more LiDARs are installed on the vehicle, the first point set may include points obtained by the two or more LiDARs. For example, the LiDAR 112, the LiDAR 114, and the LiDAR 116 may be installed on the vehicle. The first point set may include points obtained by the LiDAR 112, the LiDAR 114, and the LiDAR 116.

In 430, the point information determination module 330 may determine first 3D coordinates of the plurality of points and reflection intensities of the plurality of points based on the first point set. The points obtained by a LiDAR may include reflection intensities of the points, and 3D coordinates of the points determined under a 3D coordinate system corresponding to the LiDAR. In some embodiments, if the first point set includes points obtained by one LiDAR, the point information determination module 330 may directly determine the first 3D coordinates based on the plurality of points. In some embodiments, different LiDARs may correspond to different 3D coordinate systems. If the first point set includes points obtained by more than one LiDARs, the 3D coordinates of points obtained by different LiDARs may correspond to different 3D coordinate systems. The point information determination module 330 may determine a 3D coordinate system corresponding to one of the LiDARs as a standard 3D coordinate system, and transform the 3D coordinates corresponding to other 3D coordinate systems into the 3D coordinates under the standard coordinate system (e.g., as described in detail in connection with FIG. 5 below).

In 440, the segment result generation module 340 may generate a segment result by classifying the plurality of points based on the first 3D coordinates of the plurality of points and the reflection intensities of the plurality of points. For example, the segment result generation module 340 may classify points of which the 3D coordinates are approximately similar to the same group. As another example, the segment result generation module 340 may classify points of which the reflection intensities are approximately similar to the same group. The points in the first point set may be roughly classified into several groups based on the segment result.

The segment result generation module 340 may generate the segment result according to an algorithm that may classify the points. For example, the algorithm may be a clustering algorithm. The clustering algorithm may include a partitioning method, a hierarchical method, a density-based method, a grid-based method, a model-based method, or the like, or any combination thereof.

In 450, the transformation module 350 may transform the first 3D coordinates of the plurality of points into first 2D coordinates of the plurality of points. The transformation module 350 may determine the 2D coordinates of the plurality of points using a transformation matrix (e.g., as described in detail in connection with FIGS. 7 and 8 below).

In 460, the type determination module 360 may determine an object type of the one or more objects based on the first 2D coordinates of the plurality of points, the first 3D coordinates of the plurality of points, the segment result, and the first image. The type determination module 360 may identify the one or more objects in the first image by determining a bounding box for each of the one or more objects based on the segment result and the first 2D coordinates of the plurality of points. For one of the one or more objects, the type determination module 360 may determine the object type based on the 3D coordinates of the center point of the object, the length of the object, the width of the object, the height of the object, the number of points of the object, or the like, or any combination thereof. The center point of the object may refer to the center pixel of the bounding box of the object. The type determination module 360 may determine the 3D coordinates of the center point based on the 3D coordinates of the point of which the 2D coordinates are similar to the 2D coordinates of the center pixel of the bounding box. The type determination module 360 may determine the length, the width, and the height of the object based on the 3D coordinates of points of which the 2D coordinates are similar to the 2D coordinates of pixels included in the bounding box. The number of points of the object may be the number of points of which the 2D coordinates are similar to the 2D coordinates of pixels included in the bounding box.

The type determination module 360 may input the 3D coordinates of the center point of the object, the length of the object, the width of the object, the height of the object, and the number of points of the object into, for example, a Faster-RCNN model. The Faster-RCNN model may output probabilities of different object types the object belongs to, and take the object type with the highest probability as the object type of the object. For example, the Faster-RCNN model may determine that the probability of belonging to a vehicle is 45%, the probability of belonging to a person is 60%, and the probability of belonging to a building is 10%. The Faster-RCNN model may accordingly determine the object as a person.

In 470, the environment determination module 370 may determine environmental information relating to the one or more objects in the first image based on the object type. In some embodiments, the environmental information relating to the one or more objects may include the object type of the one or more objects, a motion state of at least one of the one or more objects, a velocity of at least one of the one or more objects relative to the vehicle, an acceleration of at least one of the one or more objects relative to the vehicle, a moving direction of at least one of the one or more objects, a distance between the vehicle and at least one of the one or more objects, or the like, or any combination thereof. The motion state may include a static state or a moving state.

The environment determination module 370 may determine the environmental information based on two successive images (e.g., the first image and the last image of the first image captured by the camera 120). Objects with the same object type in the two successive images may be marked with the same ID using, for example, data association. The data association may be configured to recognize whether two sets of data from different nodes belong to the same target. In the present disclosure, the data association may be used to recognize whether two objects in the two successive images belong to a same object type by matching the features of the two objects. The features of an object may include the 3D coordinates of the center point of the object, the shape of the object, the length of the object, the width of the object, the height of the object, the number of points of the object, or the like, or any combination thereof.

The environment determination module 370 may determine the distance between the object and the vehicle based on the 3D coordinates of the center point of the object in the first image. The environment determination module 370 may determine the velocity of the object relating to the first image based on the time interval between the first image and the last image of the first image, the distance between the vehicle and the object in the first image, and the distance between the vehicle and an object in the last image with a same object type with the object in the first image (also referred to as the object in the last image). For example, the distance between the vehicle and the object in the first image is $d_1$, the distance between the vehicle and the object in the last image is $d_2$, the time interval between the first image and the last image is $t_1$, the environment determination module 370 may determine the velocity of the object relating to the first image as $$\frac{|d_1 - d_2|}{t_1}.$$

The environment determination module 370 may determine the acceleration of the object relating to the first image based on the time interval between the first image and the last image, the velocity of the object relating to the first image, and the velocity of the object relating to the last image. For example, the velocity of the object relating to the first image is $v_1$, the velocity of the object relating to the last image is $v_2$, the time interval between the first image and the last image is $t_1$, the environment determination module 370 may determine the acceleration of the object relating to the first image as $$\frac{|v_1 - v_2|}{t_1}.$$

The environment determination module 370 may determine the moving direction of the object relating to the first image based on the 3D coordinates of the center point of the object in the first image and the 3D coordinates of the center point of the object in the last image.

When the velocity of the object relative to the vehicle is lower than or equal to a velocity threshold (e.g., 0.1 m/s), the environment determination module 370 may determine that the object is static relative to the vehicle. When the velocity of the object is faster than the velocity threshold (e.g., 0.1 m/s), the environment determination module 370 may determine that the object is moving relative to the vehicle.

Figure 5:
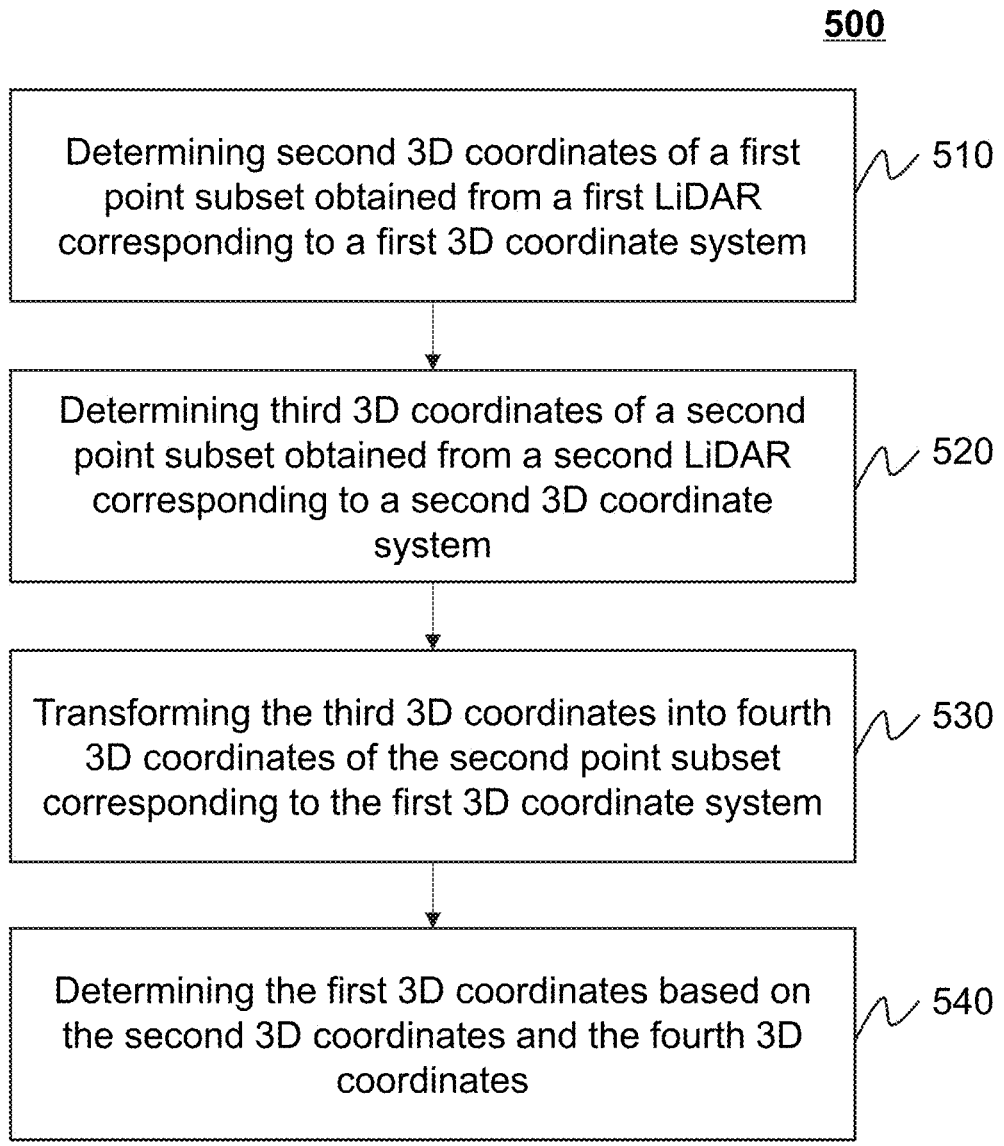
FIG. 5 is a flow chart illustrating an exemplary process for determining first 3D coordinates according to some embodiments of the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 400. As another example, the processing device 130 may perform 410 and 420 simultaneously. As still another example, the processing device 130 may perform 440 before, after, or simultaneously with 450. FIG. 5 is a flow chart illustrating an exemplary process for determining first 3D coordinates of a plurality of points in a first point set according to some embodiments of the present disclosure. In some embodiments, the process 500 may be implemented in the environmental information detecting system 100 illustrated in FIG. 1. For example, the process 500 may be stored in a storage medium (e.g., the storage device 150, or the storage 220) as a form of instructions, and invoked and/or executed by the processing device 130 (e.g., the processor 220 of the processing device 130, or one or more modules in the processing device 130 illustrated in FIG. 3). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the processing device 130 may perform 430 of the process 400 based on the process 500.

For brevity, suppose that the first point set includes points obtained from two LiDARs including a first LiDAR and a second LiDAR (e.g., the LiDAR 112 and the LiDAR 114). It should be noted that the description of the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The process 500 may be applied to a condition that the first point set includes points obtained from more than two LiDARs.

In some embodiments, the first LiDAR may correspond to a first 3D coordinate system. The second LiDAR may correspond to a second 3D coordinate system different from the first 3D coordinate system. The point information determination module 330 may select the first 3D coordinate system as a standard 3D coordinate system.

In 510, the point information determination module 330 may determine second 3D coordinates of a first point subset obtained from the first LiDAR corresponding to the first 3D coordinate system. In some embodiments, the point information determination module 330 may directly determine the second 3D coordinates of the first point subset based on the points included in the first point subset.

In 520, the point information determination module 330 may determine third 3D coordinates of a second point subset obtained from the second LiDAR corresponding to the second 3D coordinate system. In some embodiments, the point information determination module 330 may directly determine the third 3D coordinates of the second point subset based on the points included in the second point subset.

In 530, the point information determination module 330 may transform the third 3D coordinates into fourth 3D coordinates of the second point subset corresponding to the first 3D coordinate system.

In some embodiments, the point information determination module 330 may transform the third 3D coordinates into the fourth 3D coordinates using a first transformation matrix. For example, the point information determination module 330 may determine the fourth 3D coordinates based on Equation (1) below:

$$\begin{bmatrix} x_1 \\ y_1 \\ z_1 \end{bmatrix} = R_1 T_1 \begin{bmatrix} x_2 \\ y_2 \\ z_2 \end{bmatrix}, \quad (1)$$

where $x_1$, $y_1$, and $z_1$ refer to the 3D coordinates of a point under the first 3D coordinate system. $x_2$, $y_2$, and $z_2$ refer to the 3D coordinates of the point under the second 3D coordinate system. $R_1 T_1$ refers to the first transformation matrix. $R_1$ refers to a rotation matrix and represents rotation angles of the first 3D coordinate system relative to the second 3D coordinate system in x-axis, y-axis, and z-axis of the second 3D coordinate system. $R_1$ may be represented based on Equation (2) below:

$$R_1 = \begin{bmatrix} roll_1 \\ pitch_1 \\ yaw_1 \end{bmatrix}, \quad (2)$$

where $roll_1$, $pitch_1$, and $yaw_1$ refer to rotation angles of the first 3D coordinate system relative to the second 3D coordinate system in x-axis, y-axis, and z-axis of the second 3D coordinate system, respectively. $T_1$ refers to a translation matrix and represents the 3D coordinates of the origin of the first 3D coordinate system in the second 3D coordinate system. $T_1$ may be represented based on Equation (3) below:

$$T_1 = \begin{bmatrix} \Delta x_1 \\ \Delta y_1 \\ \Delta z_1 \end{bmatrix}, \quad (3)$$

where $\Delta x_1$, $\Delta y_1$, and $\Delta z_1$ refer to the 3D coordinates of the origin of the first 3D coordinate system under the second 3D coordinate system.

In some embodiments, the processing device 130 may determine the first transformation matrix in advance and offline. After determining the first transformation matrix, the processing device 130 may store the first transformation matrix into a storage medium (e.g., the storage device 150, or the storage 220). The point information determination module 330 may access the storage medium to obtain the first transformation matrix. The processing device 130 may determine the first transformation matrix based on the following operations of ($a_1$) and ($b_1$).

($a_1$) The processing device 130 may obtain first points from the first LiDAR and second points from the second LiDAR. The first points and the second points may be relating to the same object.

($b_1$) The processing device 130 may determine the first transformation matrix by matching the 3D coordinates of the first points and the 3D coordinates of the second points. For example, the processing device 130 may match the 3D coordinates of the first points and the 3D coordinates of the second points using a point cloud matching method. The point cloud matching method may include an iterative closest point (ICP) method.

In some embodiments, if the relative position between the first LiDAR and the second LiDAR is constant, the first transformation matrix (e.g., $R_1$ and $T_1$) may be constant.

In 540, the point information determination module 330 may determine the first 3D coordinates based on the second 3D coordinates and the fourth 3D coordinates.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. As another example, the point information determination module 330 may perform 510 before 520, 530, or 540. As still another example, the point information determination module 330 may perform 510 and 520 simultaneously.

Figure 6:
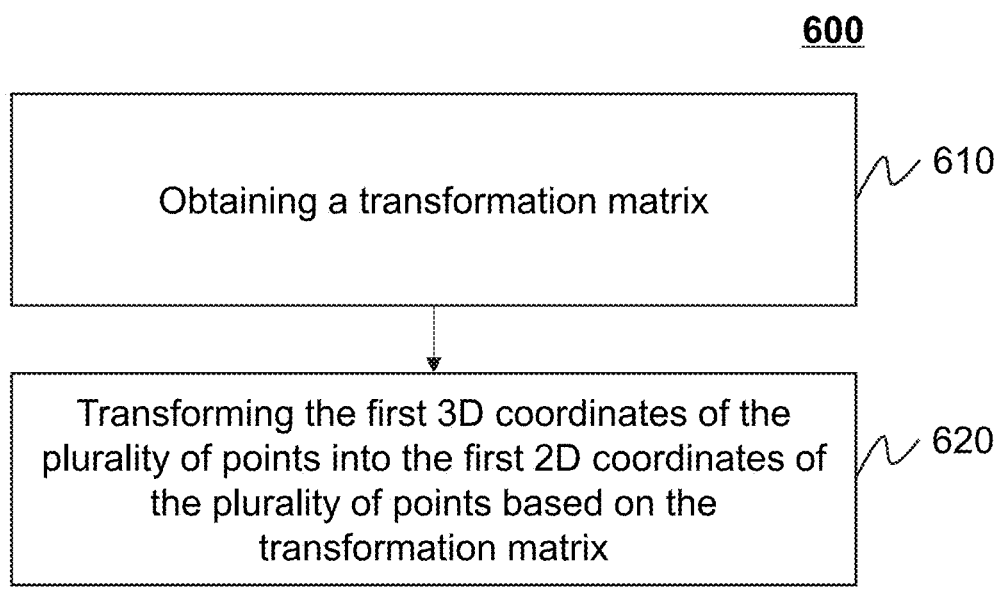
FIG. 6 is a flow chart illustrating an exemplary process for transforming first 3D coordinates into first 2D coordinates according to some embodiments of the present disclosure.

FIG. 6 is a flow chart illustrating an exemplary process for transforming first 3D coordinates into first 2D coordinates according to some embodiments of the present disclosure. In some embodiments, the process 600 may be implemented in the environmental information detecting system 100 illustrated in FIG. 1. For example, the process 600 may be stored in a storage medium (e.g., the storage device 150, or the storage 220) as a form of instructions, and invoked and/or executed by the processing device 130 (e.g., the processor 220 of the processing device 130, or one or more modules in the processing device 130 illustrated in FIG. 3). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, the processing device 130 may perform 450 of the process 400 based on the process 600.

In 610, the transformation module 350 may obtain a second transformation matrix. In some embodiments, the processing device 130 may determine the second transformation matrix in advance and offline (e.g., as described in detail in connection with FIG. 7). After determining the second transformation matrix, the processing device 130 may store the second transformation matrix into a storage medium (e.g., the storage device 150, or the storage 220). The transformation module 350 may access the storage medium to obtain the second transformation matrix.

In 620, the transformation module 350 may transform the first 3D coordinates of the plurality of points into the first 2D coordinates of the plurality of points based on the second transformation matrix. For example, the transformation module 350 may determine the 2D coordinates based on Equation (4) below:

$$\begin{bmatrix} u_1 \\ v_1 \\ 1 \end{bmatrix} = R_2 T_2 \begin{bmatrix} x \\ y \\ z \end{bmatrix}, \quad (4)$$

where $u_1$ and $v_1$ refer to the 2D coordinates of a point in the first point set. x, y, and z refer to the 3D coordinates of the point. $R_2T_2$ refers to the second transformation matrix. $R_2$ refers to a rotation matrix and represents rotation angles of the 2D coordinate system, corresponding to the first image, relative to the 3D coordinate system corresponding to the first 3D coordinates in x-axis, y-axis, and z-axis of the 3D coordinate system. $R_2$ may be represented based on Equation (5) below:

$$R_2 = \begin{bmatrix} roll_2 \\ pitch_2 \\ yaw_2 \end{bmatrix}, \quad (5)$$

where $roll_2$, $pitch_2$, and $yaw_2$ refer to the rotation angles of the 2D coordinate system relative to the 3D coordinate system in x-axis, y-axis, and z-axis of the 3D coordinate system, respectively. $T_2$ refers to a translation matrix and represents the 3D coordinates of the origin of the 2D coordinate system under the 3D coordinate system. $T_2$ may be represented based on Equation (6) below:

$$T_2 = \begin{bmatrix} \Delta x_2 \\ \Delta y_2 \\ \Delta z_2 \end{bmatrix}, \quad (6)$$

where $\Delta x_2$, $\Delta y_2$, and $\Delta z_2$ refer to the 3D coordinates of the origin of the 2D coordinate system under the 3D coordinate system.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600.

Figure 7:
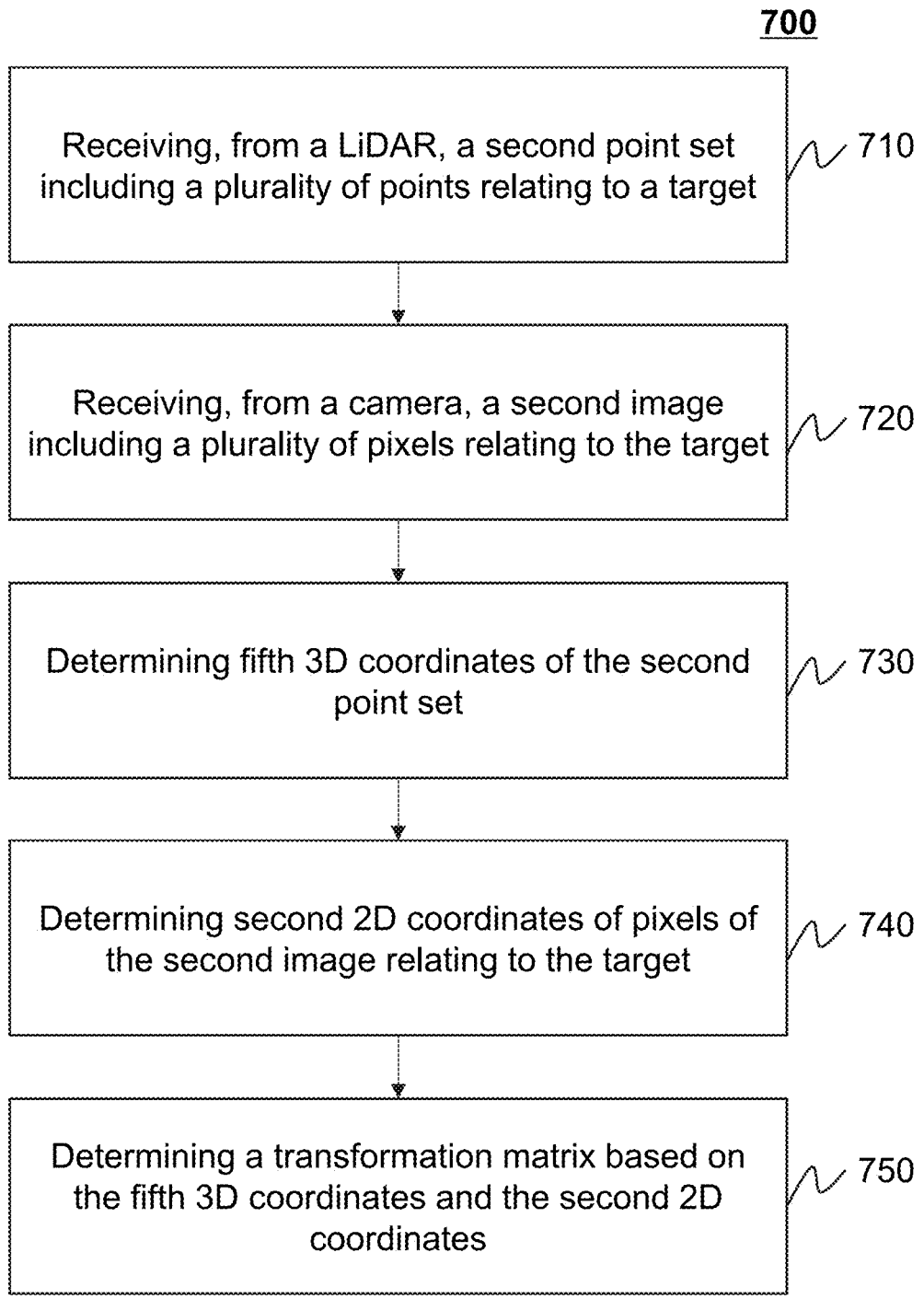
FIG. 7 is a flow chart illustrating an exemplary process for determining a transformation matrix according to some embodiments of the present disclosure.

FIG. 7 is a flow chart illustrating an exemplary process for determining a second transformation matrix according to some embodiments of the present disclosure. In some embodiments, the process 700 may be implemented in the environmental information detecting system 100 illustrated in FIG. 1. For example, the process 700 may be stored in a storage medium (e.g., the storage device 150, or the storage 220) as a form of instructions, and invoked and/or executed by the processing device 130 (e.g., the processor 220 of the processing device 130, or one or more modules in the processing device 130 illustrated in FIG. 3). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, the processing device 130 may perform 610 of the process 600 based on the process 700.

In 710, the processing device 130 may receive, from a LiDAR, a second point set including a plurality of points relating to a target. The target may include a static 2D pattern. The static 2D pattern may include one or more points, each of which may be a center of a circle. For example, the target may be a static 2D pattern having six points, each of which may be the center of a circle. The one or more points may be arranged in any order. The one or more LiDARs may emit laser beams to the six centers. The second point set may include six points corresponding to the centers of six circles. In some embodiments, the LiDAR may correspond to a standard 3D coordinate system. For example, if there are three LiDARs installed on the vehicle, the processing device 130 may determine a transformation matrix between the camera 120 and the LiDAR corresponding to which the 3D coordinate system is selected as the standard 3D coordinate system.

In 720, the processing device 130 may receive, from the camera 120, the second image including a plurality of pixels relating to the target. For example, if the target is six centers of six respective circles, the camera 120 may capture a second image including the six centers.

In 730, the processing device 130 may determine fifth 3D coordinates of the second point set. In some embodiments, the processing device 130 may directly determine the fifth 3D coordinates based on the points in the second point set.

In 740, the processing device 130 may determine second 2D coordinates of pixels of the second image relating to the target. In some embodiments, the processing device 130 may identify the pixels relating to the target (e.g., six pixels corresponding to six centers of six respective circles) and determine the second 2D coordinates of the pixels. For example, after capturing the second image, the camera 120 may transmit the second image to the processing device 130. After receiving the second image, the processing device 130 may display the second image on a screen. A user (e.g., an engineer) may select the pixels relating to the target through the screen by clicking the pixels using a hand or a mouse. As another example, the processing device 130 may automatically determine the pixels based on an image recognition technology (e.g., Template Matching, SVM classification, or a method based on gray values).

In 750, the processing device 130 may determine a second transformation matrix based on the fifth 3D coordinates and the second 2D coordinates. In some embodiments, the processing device 130 may determine the second transformation matrix based on a least square method. The processing device 130 may determine the second transformation matrix based on the following operations of $(a_2)$-$(d_2)$.

$(a_2)$ The processing device 130 may set a preliminary transformation matrix. The preliminary transformation matrix may be determined based on the experience of the user (e.g., an engineer) or default settings by the environmental information detecting system 100.

$(b_2)$ The processing device 130 may determine an estimated 2D coordinates of the points in the second point set based on the preliminary transformation matrix and the fifth 3D coordinates of the points in the second point set.

$(c_2)$ The processing device 130 may compare the estimated 2D coordinates of the points in the second point set with the second 2D coordinates of the pixels relating to the target. The processing device 130 may also determine a sum of squared deviations between the estimated 2D coordinates of the points in the second point set and the second 2D coordinates of the pixels relating to the target.

$(d_2)$ The processing device 130 may determine whether the sum of squared deviations is less than a threshold (e.g., 0.01). The processing device 130 may determine the preliminary transformation matrix as the second transformation matrix in response to a determination that the sum of squared deviations is less than the threshold (e.g., 0.01). The processing device 130 may repeat $(a_2)$-$(d_2)$ in response to a determination that the sum of squared deviations is greater than or equal to the threshold (e.g., 0.01).

Merely by way of example, the processing device 130 may determine the second transformation matrix based on Equations (7) and (8) below:

$$\begin{bmatrix} u' \\ v' \\ 1 \end{bmatrix} = R'_2 T'_2 \begin{bmatrix} x_3 \\ y_3 \\ z_3 \end{bmatrix}, \text{ and} \quad (7)$$

$$\varphi = \sum_{i=1}^{n} \left( \begin{bmatrix} u' \\ v' \\ 1 \end{bmatrix}_i - \begin{bmatrix} u_2 \\ v_2 \\ 1 \end{bmatrix}_i \right)^2, \quad (8)$$

where $x_3$, $y_3$, and $z_3$ refer to the 3D coordinates of a point in the second point set. u' and v' refer to the estimated 2D coordinates of the point. $R_2'T_2'$ refers to the preliminary transformation matrix. $u_2$ and $v_2$ refer to the 2D coordinates of a pixel in the second image corresponding to the point. n refers to the number of points in the second point set. For example, if the target is six centers of six circles, the number of points in the second point set may be six (n=6). $\varphi$ refers to the sum of squared deviations between the estimated 2D coordinates of the points in the second point set and the second 2D coordinates of the pixels relating to the target.

In some embodiments, if the relative position between the LiDAR and the camera 120 is constant, the second transformation matrix (e.g., $R_2$ and $T_2$) may be constant.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 700. As another example, the processing device 130 may perform 710 before, after, or simultaneously with 720. As still another example, the processing device 130 may perform 730 before, after, or simultaneously with 740.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
    a storage device storing a set of instructions; and
    one or more processors configured to communicate with the storage device, wherein when executing the set of instructions, the one or more processors are configured to cause the system to:
        receive, from a camera, a first image including a plurality of pixels relating to one or more objects;
        receive, from one or more light detection and ranging equipments (LiDARs), a first point set including a plurality of points corresponding to the plurality of pixels of the first image;
        determine first three-dimensional (3D) coordinates of the plurality of points and reflection intensities of the plurality of points based on the first point set;
        generate a segment result by classifying the plurality of points based on the first 3D coordinates of the plurality of points and the reflection intensities of the plurality of points;
        transform the first 3D coordinates of the plurality of points into first two-dimensional (2D) coordinates of the plurality of points; and
        determine an object type of the one or more objects based on the first 2D coordinates of the plurality of points, the first 3D coordinates of the plurality of points, the segment result, and the first image.

2. The system of claim 1, the one or more processors are further configured to cause the system to:
    determine environmental information relating to the one or more objects based on the object type.

3. The system of claim 2, wherein the environmental information relating to the one or more objects includes at least one of:
    the object type of the one or more objects,
    a motion state of at least one of the one or more objects, a velocity of at least one of the one or more objects relative to a vehicle including the one or more LiDARs and the camera, an acceleration of at least one of the one or more objects relative to the vehicle, a moving direction of at least one of the one or more objects, or a distance between at least one of the one or more objects and the vehicle.

4. The system of claim 1, wherein the first point set includes a first point subset obtained by a first LiDAR and a second point subset obtained by a second LiDAR.

5. The system of claim 4, wherein to determine the first 3D coordinates of the plurality of points, the one or more processors are configured to cause the system to:
   determine second 3D coordinates of the first point subset corresponding to a first 3D coordinate system relating to the first LiDAR;
   determine third 3D coordinates of the second point subset corresponding to a second 3D coordinate system relating to the second LiDAR;
   transform the third 3D coordinates into fourth 3D coordinates of the second point subset corresponding to the first 3D coordinate system; and
   determine the first 3D coordinates based on the second 3D coordinates of the first point subset and the fourth 3D coordinates of the second point subset.

6. The system of claim 1, wherein to transform the first 3D coordinates of the plurality of points into the first 2D coordinates of the plurality of points, the one or more processors are configured to cause the system to:
   obtain a transformation matrix; and
   transform the first 3D coordinates of the plurality of points into the first 2D coordinates of the plurality of points based on the transformation matrix.

7. The system of claim 6, wherein to obtain the transformation matrix, the one or more processors are configured to cause the system to:
   receive, from one of the one or more LiDARs, a second point set including a plurality of points relating to a target;
   receive, from the camera, a second image including a plurality of pixels relating to the target;
   determine second 3D coordinates of the plurality of points relating to the target;
   determine second 2D coordinates of the plurality of pixels relating to the target; and
   determine the transformation matrix based on the second 3D coordinates and the second 2D coordinates.

8. The system of claim 7, wherein to determine the transformation matrix based on the second 3D coordinates and the second 2D coordinates, the one or more processors are configured to cause the system to:
   determine the transformation matrix according to a least square method.

9. The system of claim 7, wherein the target includes a 2D pattern having one or more points, each of which is a center of a circle.

10. The system of claim 1, wherein to determine the object type of the one or more objects, the one or more processors are configured to cause the system to:
    determine the object type of the one or more objects according to a Faster-RCNN model.

11. A method implemented on a computing device having one or more processors and a storage device, the method comprising:

receiving, from a camera, a first image including a plurality of pixels relating to one or more objects;

receiving, from one or more light detection and ranging equipments (LiDARs), a first point set including a plurality of points corresponding to the plurality of pixels of the first image;

determining first three-dimensional (3D) coordinates of the plurality of points and reflection intensities of the plurality of points based on the first point set;

generating a segment result by classifying the plurality of points based on the first 3D coordinates of the plurality of points and the reflection intensities of the plurality of points;

transforming the first 3D coordinates of the plurality of points into first two-dimensional (2D) coordinates of the plurality of points; and determining an object type of the one or more objects based on the first 2D coordinates of the plurality of points, the first 3D coordinates of the plurality of points, the segment result, and the first image.

12. The method of claim 11, the method further comprising:
    determining environmental information relating to the one or more objects based on the object type.

13. The method of claim 12, wherein the environmental information relating to the one or more objects includes at least one of:
    the object type of the one or more objects,
    a motion state of at least one of the one or more objects,
    a velocity of at least one of the one or more objects relative to a vehicle including the one or more LiDARs and the camera,
    an acceleration of at least one of the one or more objects relative to the vehicle,
    a moving direction of at least one of the one or more objects, or
    a distance between at least one of the one or more objects and the vehicle.

14. The method of claim 11, wherein the first point set includes a first point subset obtained by a first LiDAR and a second point subset obtained by a second LiDAR.

15. The method of claim 14, wherein the determining of the first 3D coordinates of the plurality of points comprising:
    determining second 3D coordinates of the first point subset corresponding to a first 3D coordinate system relating to the first LiDAR;
    determining third 3D coordinates of the second point subset corresponding to a second 3D coordinate system relating to the second LiDAR;
    transforming the third 3D coordinates into fourth 3D coordinates of the second point subset corresponding to the first 3D coordinate system; and
    determining the first 3D coordinates based on the second 3D coordinates of the first point subset and the fourth 3D coordinates of the second point subset.

16. The method of claim 11, wherein the transforming of the first 3D coordinates of the plurality of points into the first 2D coordinates of the plurality of points comprising:
    obtaining a transformation matrix; and
    transforming the first 3D coordinates of the plurality of points into the first 2D coordinates of the plurality of points based on the transformation matrix.

17. The method of claim 16, wherein the obtaining of the transformation matrix comprising:
    receiving, from one of the one or more LiDARs, a second point set including a plurality of points relating to a target;

receiving, from the camera, a second image including a plurality of pixels relating to the target;
determining second 3D coordinates of the plurality of points relating to the target;
determining second 2D coordinates of the plurality of pixels relating to the target; and
determining the transformation matrix based on the second 3D coordinates and the second 2D coordinates.

18. The method of claim 17, wherein the target includes a 2D pattern having one or more points, each of which is a center of a circle.

19. The method of claim 17, wherein the determining of the transformation matrix based on the second 3D coordinates and the second 2D coordinates comprising:
determining the transformation matrix based on a least square method.

20. A non-transitory computer readable medium, comprising at least one set of instructions, wherein when executed by one or more processors of a computing device, the at least one set of instructions causes the computing device to perform a method, the method comprising:

receiving, from a camera, a first image including a plurality of pixels relating to one or more objects;
receiving, from one or more light detection and ranging equipments (LiDARs), a first point set including a plurality of points corresponding to the plurality of pixels of the first image;
determining first three-dimensional (3D) coordinates of the plurality of points and reflection intensities of the plurality of points based on the first point set;
generating a segment result by classifying the plurality of points based on the first 3D coordinates of the plurality of points and the reflection intensities of the plurality of points;
transforming the first 3D coordinates of the plurality of points into first two-dimensional (2D) coordinates of the plurality of points; and
determining an object type of the one or more objects based on the first 2D coordinates of the plurality of points, the first 3D coordinates of the plurality of points, the segment result, and the first image.

\* \* \* \* \*